United States Patent [19]

Katz et al.

[11] Patent Number: 5,956,081
[45] Date of Patent: *Sep. 21, 1999

[54] SURVEILLANCE SYSTEM HAVING GRAPHIC VIDEO INTEGRATION CONTROLLER AND FULL MOTION VIDEO SWITCHER

[76] Inventors: Barry Katz, 503 Cindy Cir., Penllyn, Pa. 19422; D. Mark Brian, 621 Washington Ave., Palmyra, N.J. 08065; Peter J. Gregorio, 27 W. Mill Rd., Flourtown, Pa. 19031

[ * ] Notice: This patent issued on a continued prosecution application filed under 37 CFR 1.53(d), and is subject to the twenty year patent term provisions of 35 U.S.C. 154(a)(2).

[21] Appl. No.: 08/735,607

[22] Filed: Oct. 23, 1996

[51] Int. Cl.⁶ .................................................. H04N 7/18
[52] U.S. Cl. ............................................ 348/163; 348/159
[58] Field of Search ............................ 348/159, 151–156, 348/12, 14, 218, 207, 563, 564, 565, 143, 213; 340/525, 825.22; H04N 7/18

[56] References Cited

U.S. PATENT DOCUMENTS

| | | | |
|---|---|---|---|
| 4,337,481 | 6/1982 | Mick et al. | 348/154 |
| 4,577,344 | 3/1986 | Warren et al. | 348/159 |
| 4,630,110 | 12/1986 | Cotton et al. | 348/153 |
| 4,747,041 | 5/1988 | Engel et al. | 340/825.22 |
| 4,814,869 | 3/1989 | Oliver, Jr. | 348/159 |
| 4,905,077 | 2/1990 | Ishii | 348/564 |
| 4,992,866 | 2/1991 | Morgan | 348/159 |
| 4,996,703 | 2/1991 | Gray | 340/825.22 |
| 5,040,067 | 8/1991 | Yamazaki | 348/565 |
| 5,047,858 | 9/1991 | Aimonoya | 348/218 |
| 5,109,278 | 4/1992 | Erickson et al. | 348/207 |
| 5,161,012 | 11/1992 | Choi | 348/564 |
| 5,164,827 | 11/1992 | Paff | 348/143 |
| 5,374,952 | 12/1994 | Flohr | 348/12 |
| 5,382,972 | 1/1995 | Kannes | 348/14 |
| 5,491,511 | 2/1996 | Odle | 348/153 |
| 5,537,153 | 7/1996 | Shigihara | 348/564 |
| 5,546,191 | 8/1996 | Hibi et al. | 348/564 |
| 5,760,698 | 6/1998 | Iijima et al. | 340/825.22 |

FOREIGN PATENT DOCUMENTS

2 250 156  5/1992  United Kingdom ............. H04N 7/18

OTHER PUBLICATIONS

K. E. Powell, "Automated video monitoring system", IBM Technical Disclosure Bulletin, vol. 18, no. 7, pp. 2280–2281, 12/75.

Integrated Computer/Video Display Watchdog 250, RGB Spectrum, 1993.

*Primary Examiner*—Tommy P. Chin
*Assistant Examiner*—Y. Lee
*Attorney, Agent, or Firm*—Eugene E. Renz, Jr. PC

[57] ABSTRACT

A surveillance system that includes a switcher, a selector and processor for generating a predetermined monitor display based on an operator's inputs. The processor determines a plurality of camera views that have a logical relationship to the view selected by the operator. The monitor displays the selected view and the related views in a format determined either by the operator or the processor. This system allows the operator to easily track a moving target. In addition, a touch screen monitor further facilitates the operator's ability to track a target.

4 Claims, 8 Drawing Sheets

|   | A | B | C | D |
|---|---|---|---|---|
| 1 |   |   |   |   |
| 2 |   |   |   |   |
| 3 |   |   |   |   |
| 4 |   |   |   |   |

FIG. 2A (BASED ON 4x4 GRID)

SURVEILLANCE SYSTEM HAVING GRAPHIC VIDEO INTEGRATION CONTROLLER AND FULL MOTION VIDEO SWITCHER

FIELD OF THE INVENTION

The present invention generally relates to a surveillance system, and more particularly to a system for monitoring, recording, playing back and editing video signals generated by a plurality of video cameras such that displays of the camera views are controlled either in response to an operator's input or a system signal (e.g., an alarm) and according to a predetermined order.

BACKGROUND OF THE INVENTION

Surveillance systems have a number of cameras which are used to monitor a variety of different physical areas (the cameras are primarily directed towards floor space, aisles, doorways, and loading docks). For example, in retail stores some of the more common physical areas that a retail store or supermarket may choose to monitor are the selling floor, the stock or storage area, and the shipping and receiving areas. The cameras can be fixed (providing only one view of the area) or fitted with pan, tilt and zoom features.

An operator (usually a security guard) sits at a console where the output of each camera is converted and displayed onto one or more monitors. The operator scans through the various views provided by the cameras looking for a target. A target is a predefined entity and may be anything of interest (e.g., an individual or a group of individuals exhibiting behavior indicative of theft or damage; merchandise in unexpected locations or in exposed situations; employees in unexpected or inappropriate places; etc.).

After locating the target, the operator attempts to maintain surveillance on that target until wrongful activity is detected and the individual committing the wrongful activity becomes a perpetrator. After a wrongful activity is spotted by the operator, the perpetrator is kept under constant surveillance until the perpetrator is taken into custody by the store security force or the police.

The importance of keeping a target under continuous surveillance cannot be understated. For example, if the target returns the merchandise to the selling area while out of sight, and the target is improperly detained, the store faces liability for false imprisonment.

If the cameras are equipped with mechanical pan, tilt and zoom features, the operator will have the option of locating and/or tracking a target by allowing the operator to adjust the camera via remote control to keep the target on the monitor at all times. The pan function moves a camera in a generally left-to-right or right-to-left direction; the tilt function moves the camera in a generally up and down direction; and the zoom is used to adjust the focal length of the camera's lens to provide expansive or close-up views (i.e., wide-angle to telephoto).

A variety of methods are used at the console to display the video signals input from a plurality of video cameras. In one type of surveillance system, a monitor is associated with each video camera. Accordingly, a security guard or operator of the system has in front of him a bank of monitors having a one-to-one correspondence with a particular video camera. This type of system has several drawbacks including the expense of having a monitor for each camera, physical space required to accommodate each individual monitor and the overwhelming task of the operator to review all monitors virtually simultaneously in order to identify an irregular event or intrusion.

Another system has one monitor and a plurality of video cameras in which the video signal from each camera is cycled through sequentially. The time each camera signal is viewable on the monitor is called the dwell. The particular camera order or sequence viewed on the monitor can be customized for a specific application. The sequence could be halted and the monitor could display the view from a single camera by overriding the sequence. The sequence can be restarted at a later time.

In addition, the dwell for each camera signal can be individually adjusted depending on the situation. For example, in a four camera system, the operator may view the video signal from camera one for five seconds, the video signal from camera two may then be displayed for nine seconds, the video signal from camera three may be displayed next for six seconds and finally, the signal from camera four may be viewed for fourteen seconds. After the fourth video signal is viewed, the system returns to the first video signal and the cycle is continuously repeated. The major draw back of this system is that the operator can only view the video signal from one camera at a time. Therefore, depending on the number of cameras and the period of time in which each camera is displayed on the monitor, it may take several minutes for the operator to view a particular area. Accordingly, if a target (e.g., an intrusion) is in an area monitored by a camera that is not currently being displayed on the monitor, the operator may completely miss the incident.

A variant of this last system is to have the operator manually control the dwell by pushing buttons that activate a video switch thereby allowing the operator to select a desired video signal (i.e., a desired camera corresponding to a physical area). However, a drawback of the manually selected one monitor/multiple camera switcher system is the need to use symbolic representations to indicate and differentiate the cameras and therefore the area covered by each camera. The operator must interpret each symbol in order to obtain the best camera view. It is difficult to track a fast moving target as it moves over floor space covered by several cameras. In this case, the operator must watch the direction the suspect is moving, determine the target's course and options, read and interpret the symbols, and press buttons to select the correct camera that has the target in its view. If the operator presses the wrong button, the target will be lost, thereby increasing the chances that the target will escape.

Even when the target is moving slowly, the operator may not react as quickly as needed to keep the target under continuous surveillance. Further, a VCR is normally used to record the target as it moves. If the operator pushes the wrong button, the VCR cannot record the crime or other irregular event.

Moreover, all new operators, and operators that have been trained on the system but are new to the site, require time to be trained on the symbolic mediated systems.

SUMMARY OF THE INVENTION

A monitoring, recording, play back and editing system in accordance with the present invention includes a plurality of video cameras monitoring discreet physical areas. Each camera generates an associated video signal. A switching means combines the plurality of video signals into a composite signal. A monitor receives the composite signal and displays images of the physical areas for review by an operator. A selection means communicates with the monitor for controlling the switching means thereby generating a composite signal corresponding to a predetermined order of the camera views. An input means communicates with the selection means and switch means to override the predetermined order of camera views for receiving an input from the operator corresponding to a desired view of the physical areas.

The objects and advantages of the subject invention will become apparent after considering the following description and the accompanying drawings.

BRIEF DESCRIPTION OF THE DRAWINGS

FIGS. 2A–2C show typical monitor arrays based on a 4×4 grid.

DETAILED DESCRIPTION OF THE PREFERRED EMBODIMENT

The monitoring system in accordance with the present invention is generally indicated at 10. The subject invention may be more fully appreciated by those skilled in the art when considered in connection with U.S. Pat. No. 5,216,502 issued Jun. 1, 1993 to Barry Katz (application Ser. No. 07/629,255) and pending U.S. patent application, Ser. No. 08/232,363, filed Apr. 25, 1994 in the name of Barry Katz. U.S. Pat. No. 5,216,502 and application. Ser. No. 08/232, 363 are hereby incorporated by reference into this specification as if fully set forth herein.

Figure 1:
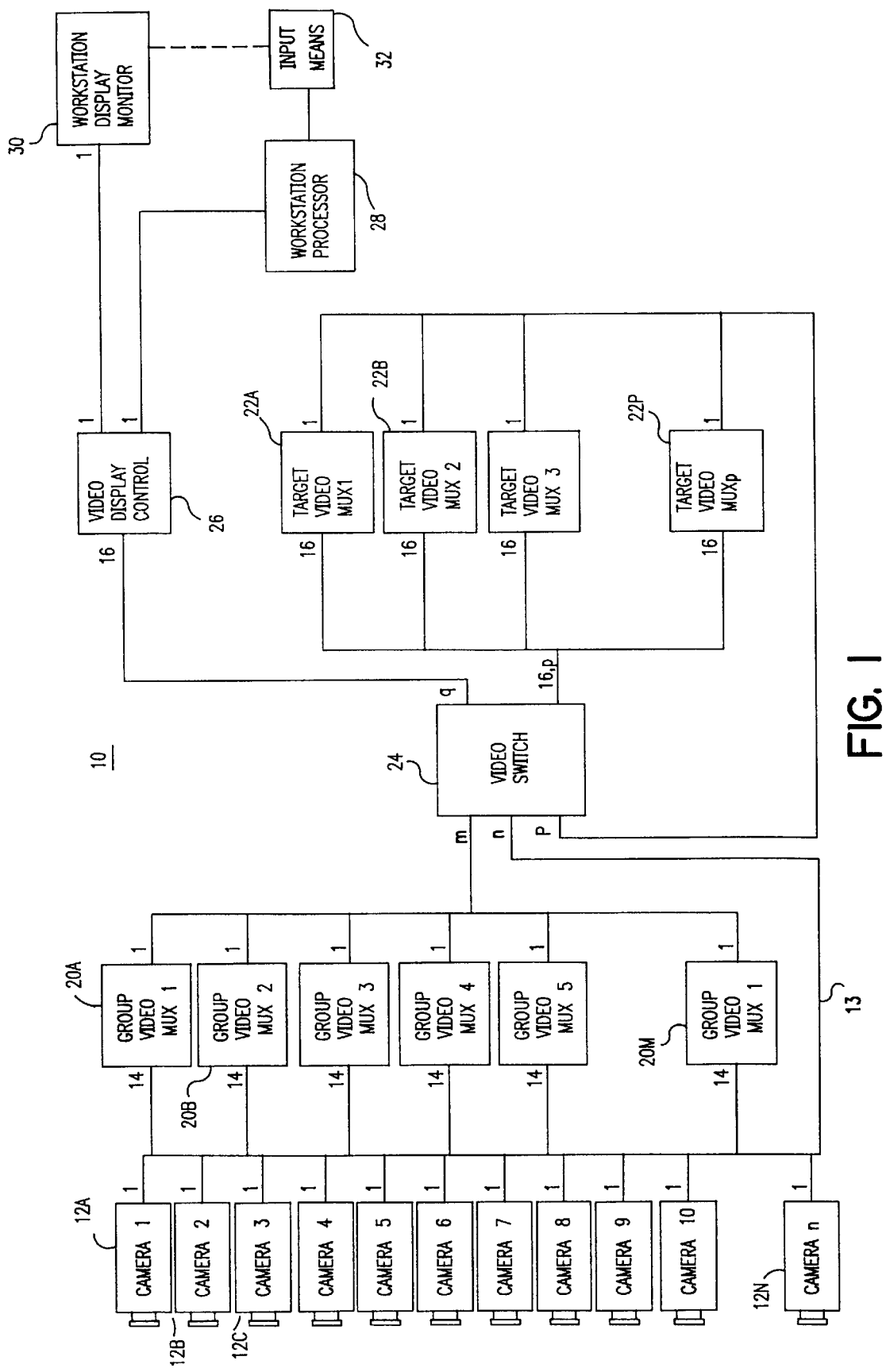
FIG. 1 is a schematic block diagram of the surveillance system in accordance with the instant invention.

As seen in FIG. 1, the monitoring system 10 includes a plurality of cameras 12A, 12B, 12C . . . 12n. Each camera 12 is positioned to cover a specific physical area. In a supermarket, the physical area may include the aisles which shoppers walk in, doors, manager's offices, checkout lanes, stock rooms, loading docks, ticketing areas, or any other area of importance.

The surveillance system 10 also includes a plurality of video multiplexers 20A, 2B . . . 20m, a video switch 24 and a plurality of target video multiplexers 22A, 22B . . . 22p. Each camera is connected individually to the video switch 24 via cable 13. In addition, depending on the physical location of each camera, the cameras are connected in a logical arrangement to one or more of the group video multiplexers 20. In a typical arrangement having several scores of cameras, the preferred group multiplexer 20 has an input to accept sixteen different video signals from sixteen different cameras. The sixteen cameras are usually related in some manner (e.g., sixteen cameras monitoring sixteen adjacent aisles.) Therefore, after the operator selects a desired camera view, theoretically all of the remaining n−1 (where n is the number of cameras) related views can be simultaneously displayed.

The target video multiplexers 22 operate in a similar fashion. However, they are connected only to the video switch. The arrangement of the target multiplexers allow the operator to view non-related groupings of video cameras or, if there are a plurality of monitors, to view multiple targets that are located at separate physical areas in the retail store.

An input means 32 allows the operator to select the desired view for display on a monitor 30. The input means 32 is connected to a processor 28 which interprets the signals and directs the appropriate video signal to the monitor 30 via a video display control 26 and the video switch 24. In the preferred embodiment, the input means 32, processor 28 and monitor 30 usually form the selection means and can be a personal computer or work station. In this scenario, the input means can be a plurality of common devices used to input information into the processor, e.g. a mouse or a keyboard. However, as will be discussed more fully hereafter, the primary input means is preferably a touch screen input on the monitor 30.

The size of the monitor 30 is preferably at least twenty inches measured diagonally, although almost any size monitor is acceptable. The monitor 30 may be defined as having a grid of cells, wherein a cell is defined as the smallest single camera view. The number of cells depends on the size of the monitor, and the the greatest number of camera views that an operator can comfortably view on the monitor.

Figure 2A:
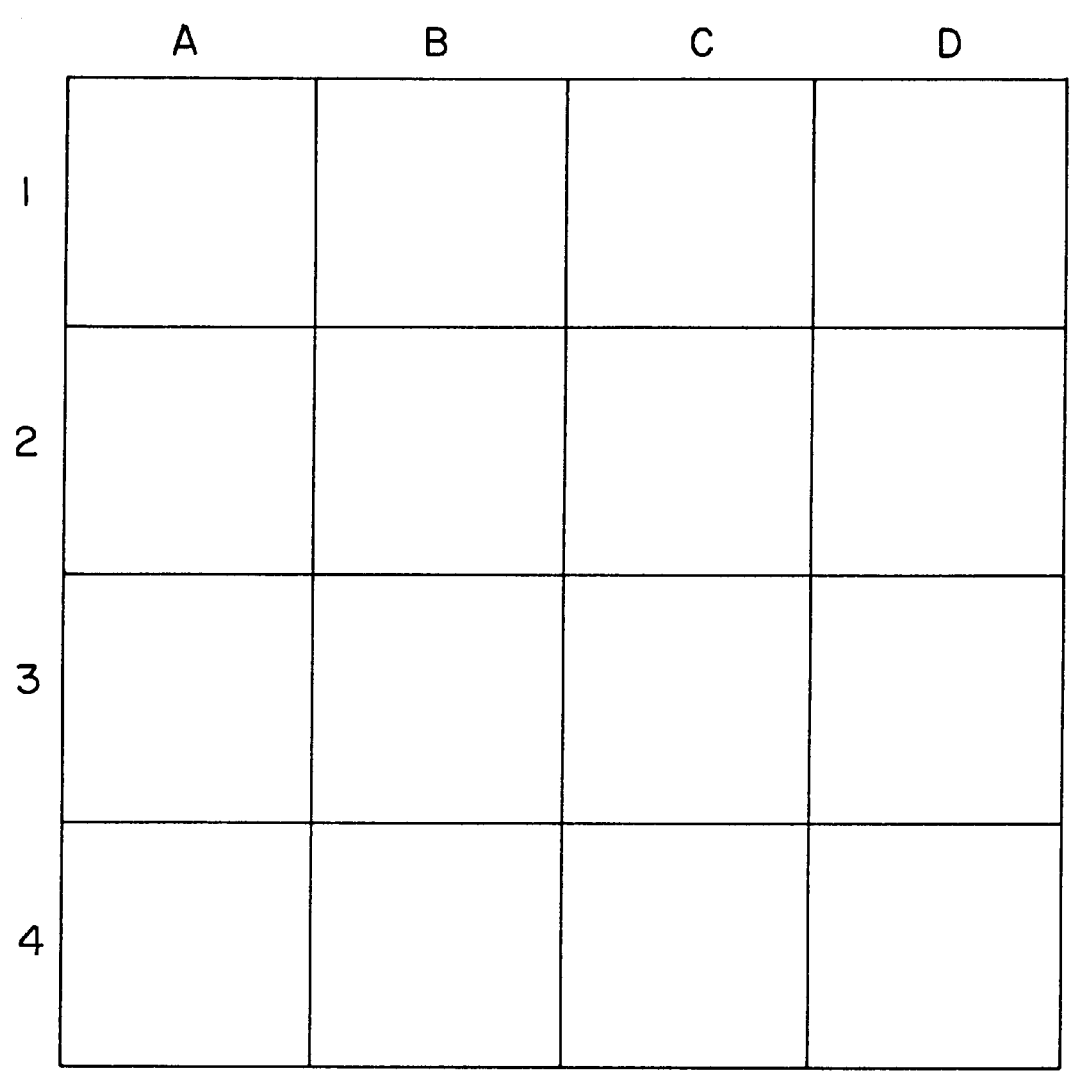

A four-by-four grid (i.e., sixteen camera views), as shown in FIG. 2A, provides a good compromise between a reasonable number of camera views and an acceptable degree of clarity of a single cell. However, two or more cells may be combined for displaying a single camera view. Therefore, in the preferred embodiment, an operator can choose to contemporaneously view on the monitor between sixteen separate camera views (each view being the size of one cell) or one view having a total size of sixteen cells (i.e., taking up the entire screen of the monitor).

Figure 2B:
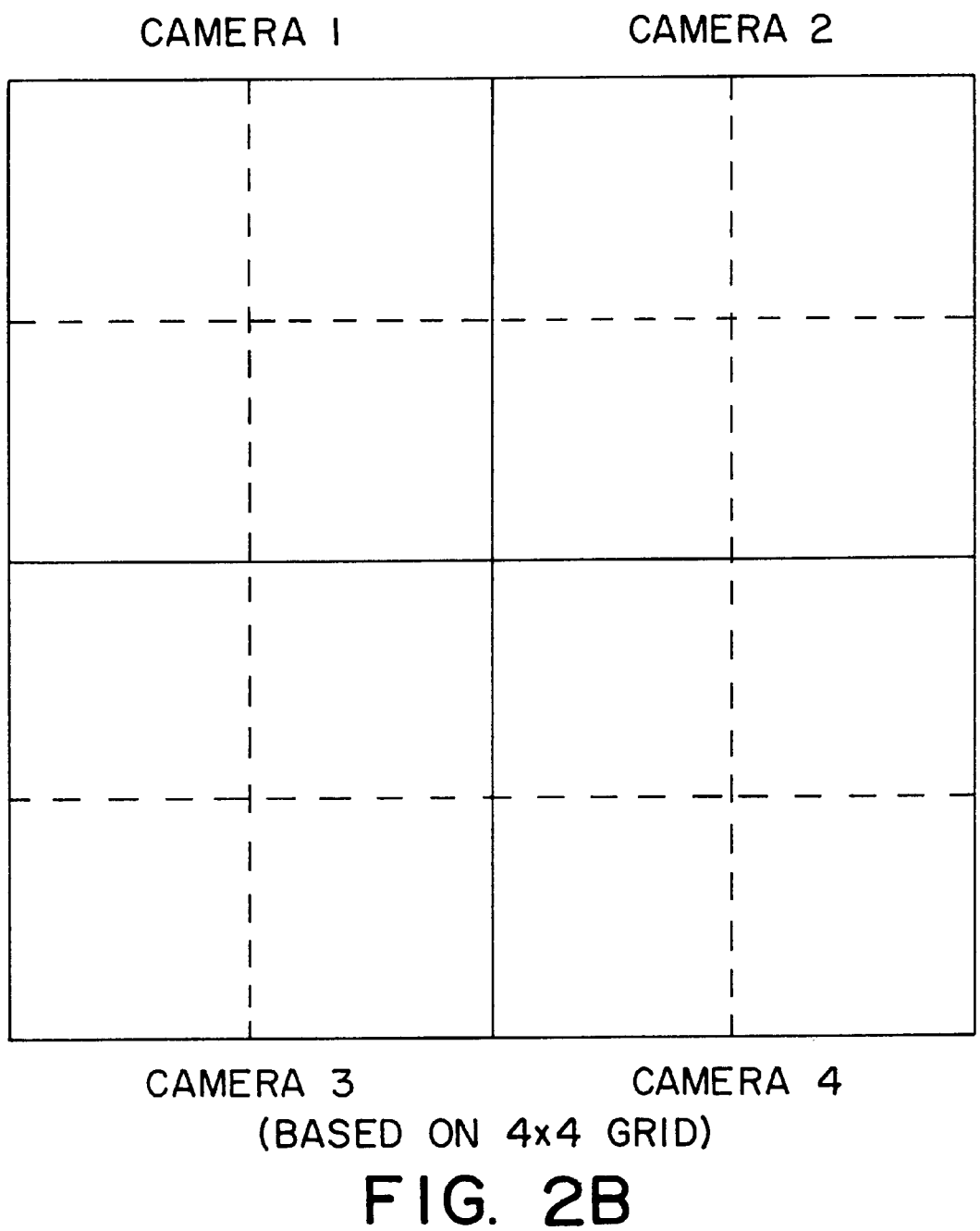
Figure 2C:
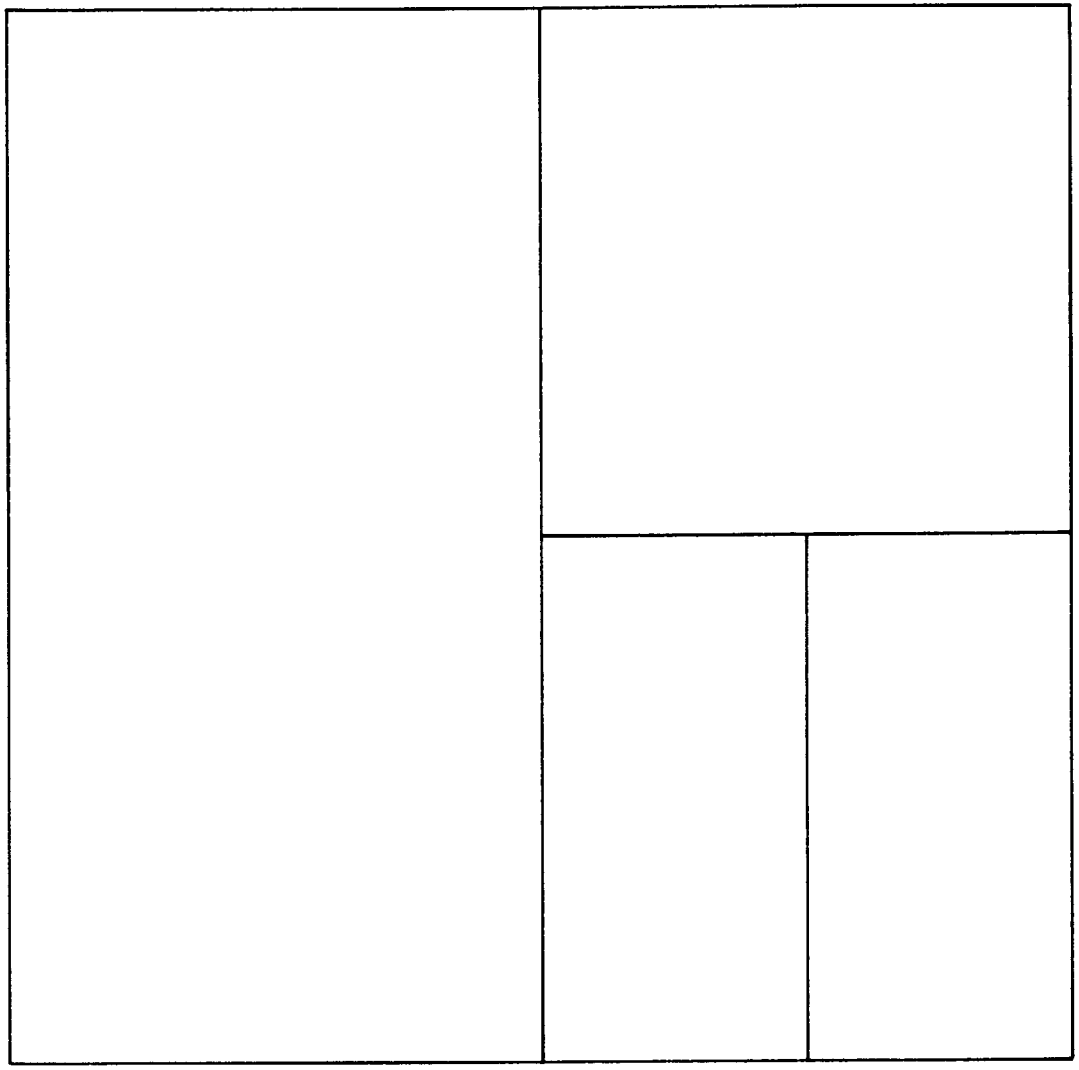

An array is defined as the number of camera views that are being simultaneously displayed on the monitor. As shown in FIG. 2B, an array may consist of four equally sized camera views, each view taking up four cells. However, since any number of cells can be joined together to display a single camera view, each camera view does not have to be the same size. That is, eight cells can be used to display one camera view—thereby using up half of the available display area of the monitor 30—four cells can be used to display a second camera view—thereby using up a quarter of the available display area of the monitor 30—and two cells each can be used to display an additional two camera views (i.e., a third camera view and a fourth camera view), as shown in FIG. 2C. Therefore, the array shown in FIG. 2C consists of four views having three differently sized display areas.

The operator usually selects an initial camera view, via the input means 32, that he wishes to have displayed on the monitor. However, in the preferred embodiment, the processor 28 determines the remaining views shown in the array. The camera views determined by the processor 28 would normally have some logical connection to the initial view selected by the operator. For example, the processor may display the views from the three cameras closest to the camera selected by the operator (assuming an array having four views as shown in either FIG. 2B or FIG. 2C). The processor 28 may also determine the positions of the camera views on the monitor 30, however, the largest viewing area, i.e., grid of cells, of the array is usually reserved for the view selected by the operator. In the example shown inn FIG. 2C, the camera view selected by the operator would usually be positioned in the eight cells, i.e. camera 1; the next most important or related camera view (which is usually determined by the processor 28), is positioned in the four cells, i.e. camera 2, etc.

The processor 28 will automaticaly determine the next array that is shown. (That is, the camera views related to the camera view selected by the operator will automatically be positioned into the remaining grids of the array.) The array displayed on the monitor before the selection will be the array in which the processor will use to determine the related camera views to display on the monitor 30. Therefore if the monitor array of FIG. 2C is used when the operator mares his selection, the operator's selected camera view will be positioned in camera 1 are, and the processor will determine the camera views displayed in the areas reserved for cameras 2, 3 and 4.

After the operator selects a camera view, the processor automatically presents an array that is optimized for continuous surveilliance. The camera views selected by the processor are usually arranged so that the target is continuously kept in view either in a central cell, or in the monitor area defined by the largest grid of cells. Alternate camera views are presented in other cells of the array. The logical arrangement of the camera views and the size of the camera views are also strategically determined. This auto flow process is immediately available with one touch selection of the monitor by the operator.

It should be noted that the subject surveillance system may utilize more than one monitor. For example, in a system having two monitors, the camera view selected by the operator may occupy the entire viewing area of the first monitor, while the array of camera views determined by the processor are displayed on the second monitor.

In addition to live review by an operator, the instant invention also controls and mediates the camera view selections so as to create display outputs for display on viewing devices, such as computer CRT's and CCTV monitors, or forwards the signal to storage devices such as VCR's, digital audio tapes (DAT), video disks or DLT's. The present invention can be used as an editing controller for recorded media replay as well as for control of live views. In addition, the subject invention may be used to control and function as an editor for large video recording libraries. The preferred embodiment of this type of system includes recording the full view signal from all cameras in the surveillance system. The invention may be used to control the input and output of the recorded video. Upon replay, the view selection process is similar to the selection process of live video. The replayed video may be sent to display and/or recording devices, or even to other output devices such as printers, or communication devices such as modems.

The subject survelliance system may also include an informated user interface. The term informate as used herein is defined as the addition of explicit information content to the system resources as a result of the work processes performed (See In the Age of the Smart Machine, by Dr. Shoshana Zuboff). An example is the collecting of inventory information as a result of bar code scanning at supermarket registers. Bar code scanning is estimated to reduce error rates to one percent and to considerably speed up the registration or check-out process. The fact that each item is identified for the price look-up process creates the opportunity to count the number of individual items sold. This register process is said to informated.

In the subject surveillance system, the operator's input is preferably captured and recorded by a processor to a file that can be used by the system as data. The user input or work process that is mediated by a processor is said to be informated.

Figure 3:
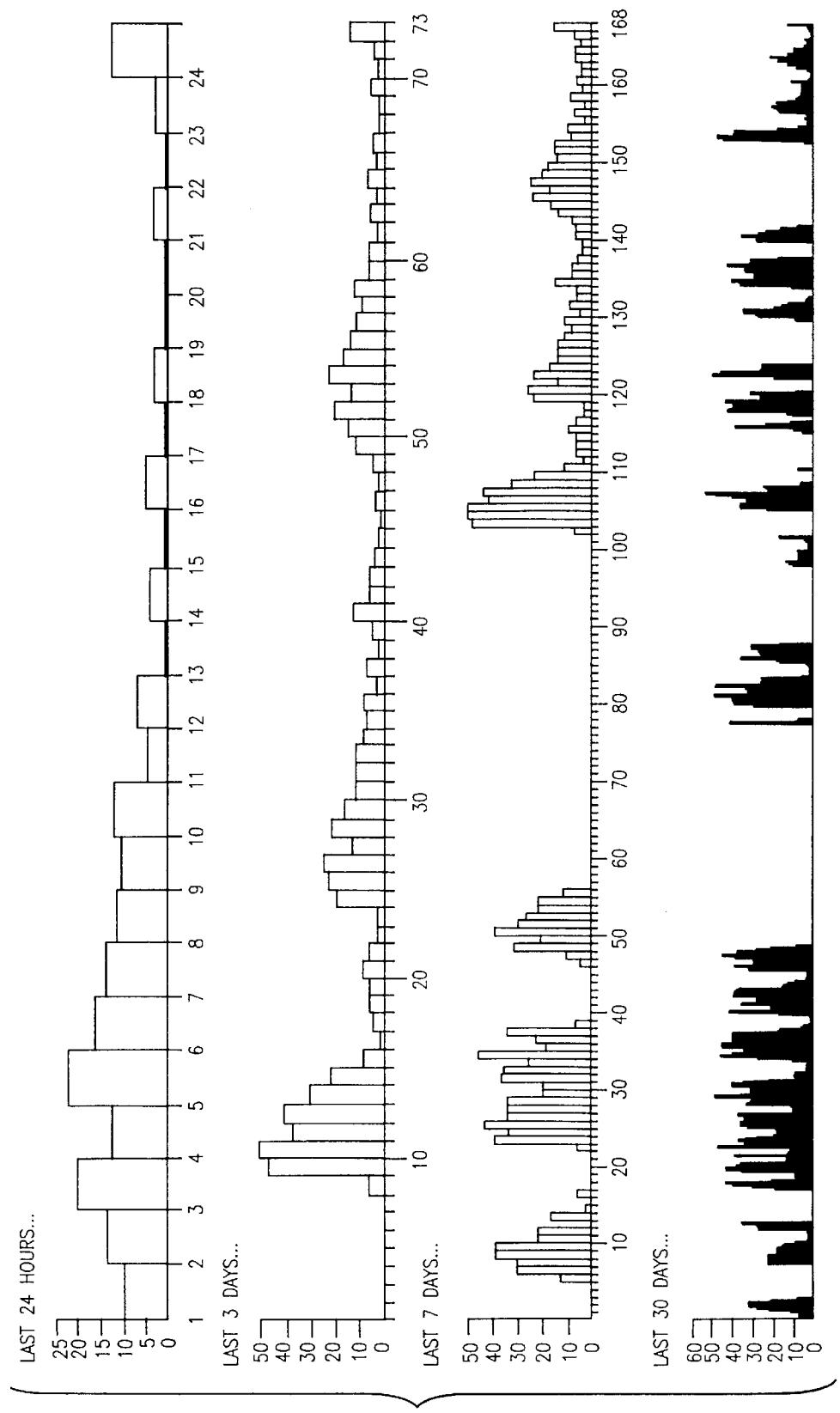
FIG. 3 is a graph of operator activity versus time periods.

All of the interactions between the operator and the present surveillance system 10 are captured and stored in a file. This file can be used to produce statistics that measure the level of work performed by the operator. As shown in FIG. 3, the selection activity of each operator (i.e., the gross number of times the operator selected a different view on the monitor) is displayed for various time periods.

When the operator tracks a target using the instant invention, a file of all of the operators' commands and responses is created, this file includes all of the interactive inputs and the exact time and date of their occurence. When the media is inserted into computer controllable media players and cued to their starting points, the instant invention can use the file of commands and responses to reconstruct the states of the output devices at the time of live interaction.

As seen in the graph labeled "Last 24 hours" of FIG. 3, there was no activity by the operator during the thirteenth, fifteenth, seventeenth, nineteenth, twentieth and twenty-second hours. This information can be reconciled with the operator's schedule to determine if the operator performed or did not perform his duties (e.g., the operator was away from or sleeping at the console, did not monitor the appropriate camera views during a specific period of time, was scheduled for a lunch break or some other duties, etc.)

When employed in a system that has the complete resident playback capability (such as disclosed in U.S. Pat. No. 5,216,502 or in U.S. application Ser. No. 08/232,363), this feature enables the user to recreate what was being displayed on the system console at any given time. It further supports replaying the sequence of changes to the display arrays and virtual pan, tilt and zoom changes to the displays in a sequence that is congruent with the original setup. The instant invention improves target selection and PTZ control performance (i.e., affords the informating of the operator's job performance) and provides a means of assuring that all of the data included in the recording process is valid and has not been altered.

All of the benefits listed above are possible because the system has a file that includes all of the state changes for all of the components that are in communication with the processor; all of the data entries in the file include the time and date; replacing all of the media in the appropraite components and calibrating everything to the earliest time will allow the system to recreate or edit an output based on the event list in the file; the exact timing and sequence will be reproduced; the use of a verification or security technique will assure that the output will be admissible evidence in court.

Figure 4:
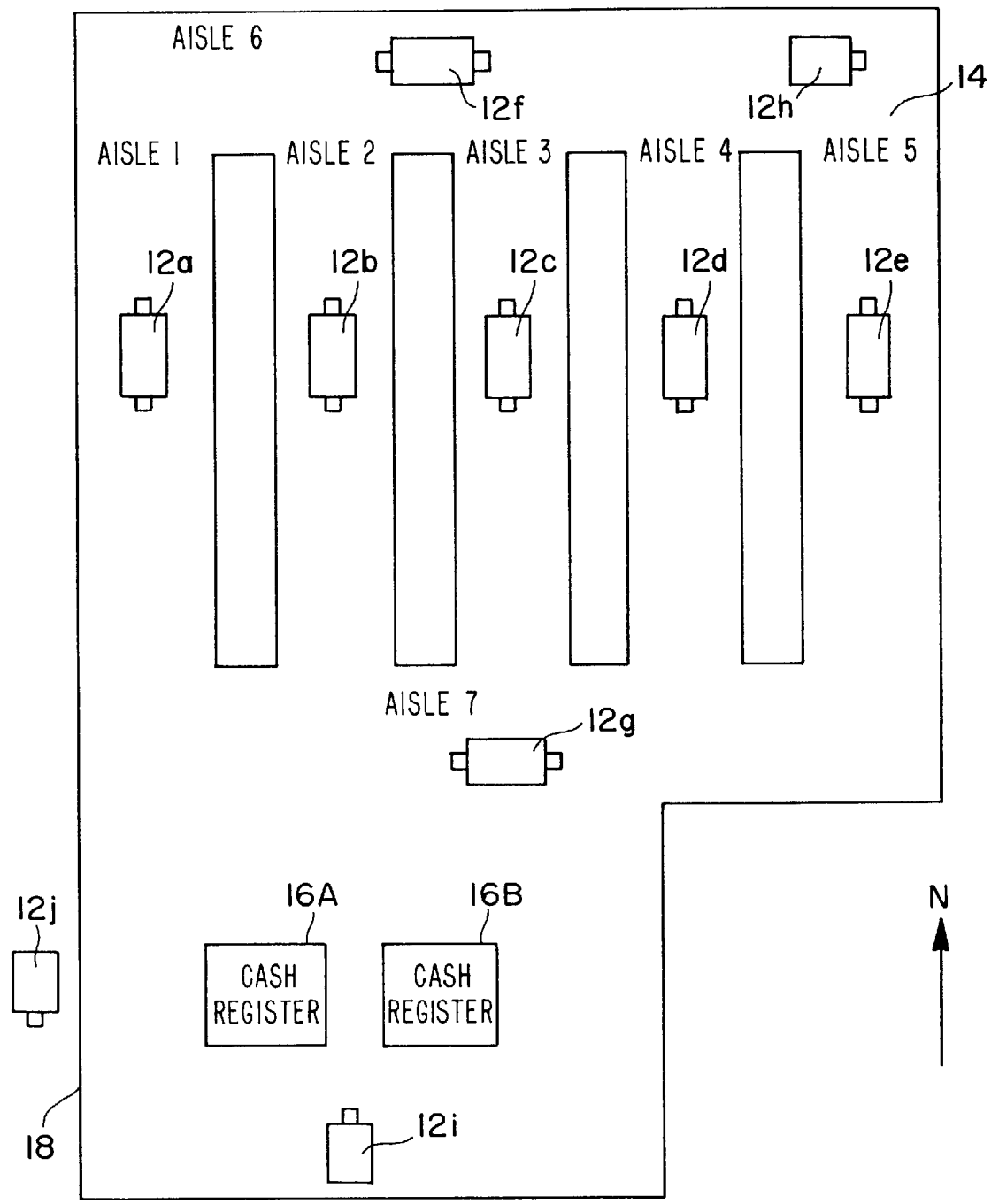
FIG. 4 is an example floor layout showing the positions of the camera for use in the subject surveillance system.

FIG. 4 depicts a hypothetical retail establishment in which ten cameras (12A through 12J) have been deployed. Since there are no more than sixteen cameras, only a single group multiplexer 20 is needed for this hypothetical situation. Target multiplexers 22A, 22B, 22C, . . . are used to accept camera outputs from a number of other multiplexers or cameras. In a very large system, where there are many cameras, a target multiplexer is used to combine camera signals that are selected from many different multiplexers and to combine them in one array and one signal output.

The floor layout of this hypothetical retail establishment includes five aisles (Aisles 1–5) running north-south and two aisles (Aisles 6 and 7) running east-west. A first camera 12A is positioned to cover aisle 1, a second camera 12B is positioned to cover aisle 2 and other cameras are positioned to cover the remaining aisles. An eighth camera 12H is chosen to cover a doorway 14. The doorway may be the entrance into the employee lounge, the manager's office, an emergency exit, etc. A ninth camera 12I is positioned to cover two cash registers 16A and 16B. The tenth camera 12J is used to cover the main entrance/exit to the store.

The layout of the cameras is determined primarily by the size and configuration of the store. However, additional factors may be taken into account, e.g., the budget of the store, the reason the surveillance system is employed (theft by customers from the floor, theft by the cashiers, etc.).

If the target is in aisle 5, the operator can select the screen format on the monitor to best view the target. In this case, the operator may wish to have the view from camera 12E on half the screen and split the remaining screen into eighths (i.e., one quarter of a half screen) as shown in FIG. 6A. The limit to the number of screen formats available to the operator are determined by the number of multiplexers employed and, to a lesser extent, on the size and/or resolution of the monitor.

Based on the array or screen format previously selected by the operator, and the initial camera view selected by the operator, the surveillance system will automatically selected by the remaining camera views displayed on the monitor. The processing means determines a pre-selected or a logical relationship of the remaining camera views based on the camera view selected by the operator. In many embodiments, the predetermined relationship is the physical areas directly adjacent the area monitored by the selected camera (i.e., the areas to which a target can move).

Figure 5A:
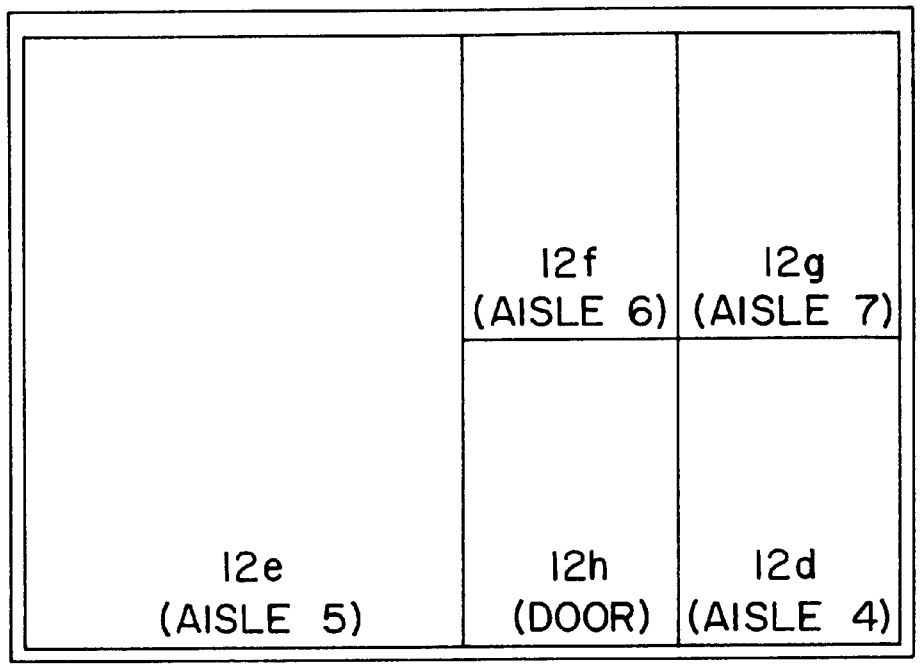
FIGS. 5A and 5B show a typical monitor display for a specific situation in connection with the example floor space of FIG. 4.

In this example it is assumed that the array is configured as shown in FIG. 5A (i.e., eight cells for one camera view and two cells for each of the remaining four camera views). If the operator notices a person exhibiting behavior indicative of theft, the operator should choose this person as a target. If the operator initially observes the target in aisle 5, the operator will select a camera view corresponding to aisle 5. This may be done by using the keyboard or, preferably, if aisle 5 is presently displayed in any camera view on the operator's monitor, by touching the screen of the monitor over the aisle 5 camera view. After the operator has selected the aisle 5 camera view as the desired view, the surveillance system will automatically display the camera views corresponding to aisle 6, aisle 7, door 14 and aisle 4. The surveillance system would likely select these four camera views since these are the areas to which a target must travel. (That is, a target in aisle 5 cannot move out of aisle 5 without passing through a physical area monitored by cameras 12D, 12F, 12G, or 12H). Therefore, the operator will be sitting in front of a monitor that has the screen display as shown in FIG. 5A.

Figure 5B:
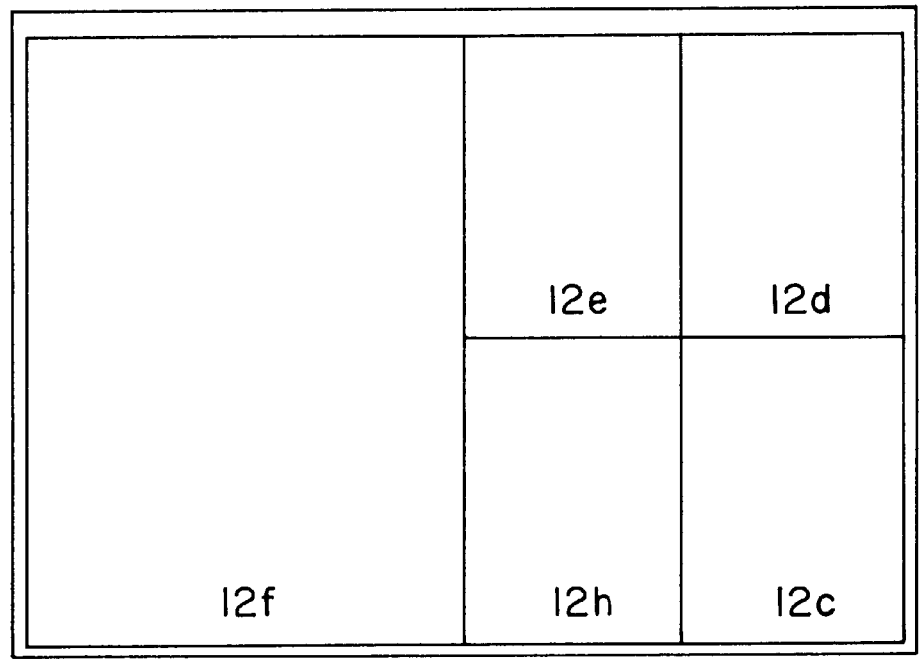

The left half of the screen will be on the target, allowing the operator to clearly observe the target in aisle 5. If the target is moving northward in aisle 5, the target must either exit out door 14 or turn onto aisle 6. Accordingly, after the operator selects the camera view corresponding to aisle 5, the processor automatically provides the operator with the most logical views that permit continuous tracking of the target. Therefore, as the target enters aisle 6, the operator can easily track him with camera 12F. The operator can select camera 12F by touching the monitor anywhere on the portion of the screen corresponding to camera 12F. If the operator does not change the screen format, the monitor will then automatically switch the view on the monitor from the screen of FIG. 5A to the screen shown in FIG. 5B, such that the video signal from camera 12F is occupying the left half of the screen. The processing means determines a new set of views based on a logical relationship with camera 12F. In this case, cameras 12C, 12D, 12E and 12H are displayed as shown in FIG. 3B.

At any time, the operator can override the predetermined sequence of the surveillance system to provide desired views of any and all cameras.

Figure 6:
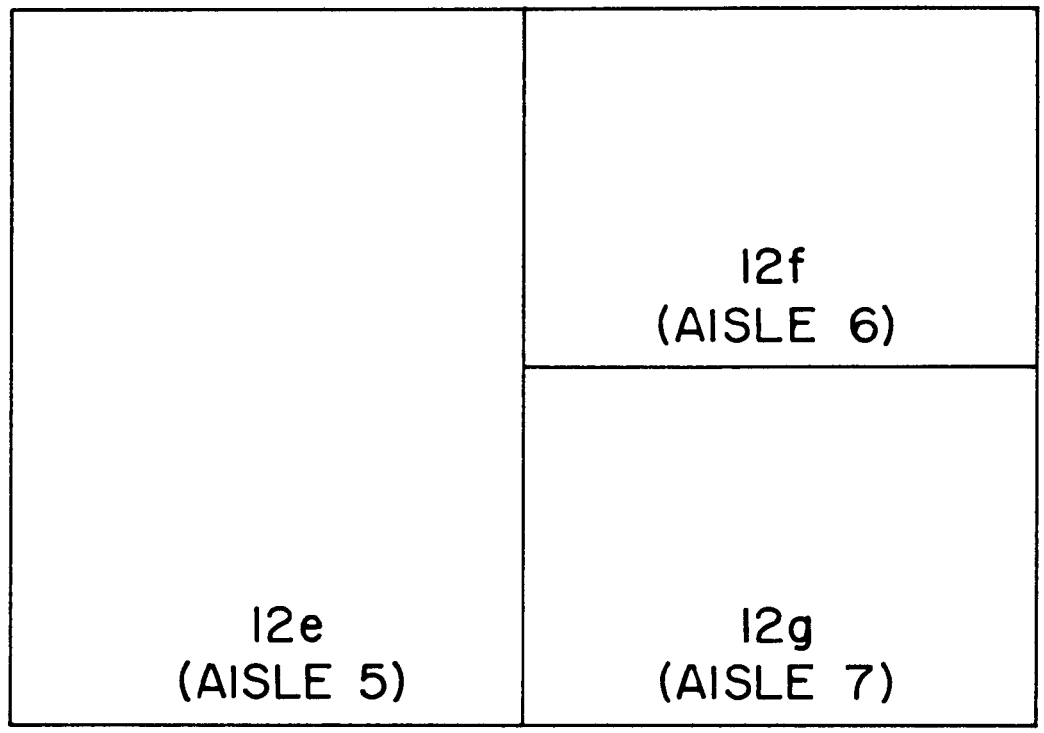
FIG. 6 shows the display of FIG. 5A wherein the screen format has been changed.

Note that the screen formats are chosen by the operator. Depending on the number of multiplexors used and the size of the physical area being monitored, more or less camera views may be displayed on the monitor. Therefore, if the operator wishes to have the primary camera view occupying half of the monitor and only two other related views occupying the remaining half of the monitor, a target in aisle 5, may appear as shown in FIG. 6. In this format, the surveillance system may display the signals from camera 12F and 12G on the quarter screens on the right half of the monitor since these are the principal aisles connected to aisle 5.

The operator can customize the view in order to keep better track of the target by using the pan, tilt and zoom functions of the camera. The camera may be controlled by the operator via the keyboard, touch screen or mouse in cooperation with the processing unit, or by a separate controller. The mechanical pan and tilt commands physically move the camera in a desired direction. That is, motors will move the camera left and right (pan) or up and down (tilt). The mechanical zoom will physically change the focus of the camera lens. The operation and control of the mechanical pan, tilt and zoom are known in the art.

In contrast to the mechanical pan, tilt and zoom that physically moves the camera, the present surveillance system may also include a virtual pan, tilt and zoom in which the processing unit manipulates the video signal from a camera to change the view. In the screen format as shown in FIG. 3A, the operator may touch the portion of the monitor corresponding to camera 12e to increase the magnification (i.e., zoom) a pre-set factor. For example, each touch to the monitor area corresponding to camera 12e may double the magnification. After the maximum magnification is achieved, any further selection would reduce magnification by a pre-set factor.

In the preferred embodiment, the instant invention also automatically centers the target or other physical area selected on the monitor by the operator. That is, if the operator desires to view an area in the upper right portion of the cell, the operator touches the exact portion of the monitor over the desired area. The instant invention will place that portion of the view into the center of the monitor. This may be accomplished by either the mechanical PTZ or the virtual PTZ. This feature would assist the operator in keeping track of a moving target.

Even though particular embodiments of the present invention have been illustrated and described herein, this is not intended to limit the invention. It is therefore to be understood that modification and variation of the embodiments described above may be made without departing from the spirit or scope of the invention.

We claim:

1. A system for monitoring a surveillance area and tracing an event occurring in the surveillance area, comprising:
   a) a plurality of video cameras for monitoring the surveillance area, each camera generating an associated video signal;
   b) means for recording said video signals for playback;
   c) means for generating composite video signals of the cameras in the surveillance area;
   d) a monitor for receiving the composite signals and displaying image cells on a grid of said composite video signal;
   e) means for identifying an event occurring in the surveillance area; and
   f) means containing preprogrammed instructions and commands responsive to an operator's selection of an image cell for said given event to automatically reconstitute said monitor from said plurality of image cells of said composite signals to the image cell of said event and a preprogrammed grouping of image cells related to said event, said grouping being less than said image cells of said composite signal.

2. A system as claimed in claim 1 wherein said means for generating composite video signals comprises a plurality of first multiplexers and switch means for selectively activating selected ones of said multiplexers.

3. A system as claimed in claim 1 wherein said multiplexers comprises a group of first multiplexers for generating composite video signals of the images related to the event and the preprogrammed images related thereto and a plurality of second multiplexers for generating composite video signals of images non-related to said event.

4. A method for monitoring a surveillance area and tracking an event occurring in the surveillance area, comprising the steps of:

a) monitoring the surveillance area with a plurality of television cameras, each camera generating an associated video signal;

b) recording said video signals for playback;

c) combining said plurality of video signals into a composite signal;

d) displaying images of said composite signal on a grid comprised of a plurality of image cells on a single monitor;

e) identifying an event occurring in at least one image cell of said plurality of image cells of said composite signals;

f) automatically reconstituting the monitor from the plurality of image cells of the composite signal to said at least one image cell of the event and a preprogrammed grouping of image cells related to said event, the grouping being less than the image cells of the composite signal; and g) placing the reconstituted image cells anywhere on said monitor.

* * * * *